(12) United States Patent
Hosny (10) Patent No.: US 6,344,797 B1
(45) Date of Patent: Feb. 5, 2002

(54) DIGITAL ELECTRONIC LOCATOR

(76) Inventor: Diaa M. Hosny, 1356 Via Caronel, Palos Verdes Estates, CA (US) 90274

(*) Notice: Subject to any disclaimer, the term of this patent is extended or adjusted under 35 U.S.C. 154(b) by 0 days.

(21) Appl. No.: 09/358,507

(22) Filed: Jul. 21, 1999

(51) Int. Cl.⁷ .............................................. G08B 23/00
(52) U.S. Cl. .................. 340/573.1; 340/505; 340/524; 340/825.49; 340/825.36; 340/825.58; 342/430; 342/450; 342/357.08
(58) Field of Search ............................. 340/573.1, 505, 340/506, 524, 539, 825.49, 825.36, 825.58; 342/430, 450, 357.07, 357.08; 375/295, 303, 316, 323, 334; 455/42, 91, 130, 134

(56) References Cited

U.S. PATENT DOCUMENTS 5,119,072 A * 6/1992 Hemingway ............. 340/573.1
5,298,883 A * 3/1994 Pilney et al. ............. 340/573.1
5,661,460 A * 8/1997 Sallen et al. ............. 340/573.1
5,945,947 A * 8/1999 Cunningham ............... 342/442

* cited by examiner

Primary Examiner—Benjamin C. Lee
Assistant Examiner—Toan Pham (57) ABSTRACT

A digital electronic locator which assists in locating the position and direction of an object/animal/person is described. Three configurations of the locator are presented; the first one is the basic configuration which gives an alerting means (Audio and/or visual) to indicate the location of an object/animal/person, the second configuration of the locator, in addition to providing the facility offered by the basic configuration, indicates the direction of an object/animal/person, the third configuration of the locator is used for locating person, in addition to providing the facilities offered by the basic and the second configuration it provides the direction of the searcher to the person being located who can, as well, acknowledge that he/she has been found.

40 Claims, 8 Drawing Sheets

DIGITAL ELECTRONIC LOCATOR

BACKGROUND OF THE INVENTION

A problem which is encountered virtually in every day life by many people, is trying to locate the position of an object which has been misplaced or an animal or a person who has gone astray. This invention describes three configurations of a device which can assist in searching for the missing objects and in locating lost animals/persons, thus stopping people wasting a great deal of time and effort trying to locate them.

(1) Field of the Invention

This invention assists searching for lost objects/animals/persons. It offers simplicity in structure and use. The basic configuration of the invention gives an alerting means (audio and/or visual) to assist the searcher in locating an object/animal/person.

The second configuration of the invention provide information to the searcher regarding the direction of an object/animal/person. This is realized in a simple and straight forward way by means of an arrow engraved on a disc which is mounted on a motorized means carrying the antenna. The direction of the arrow will be locked towards the direction of an object/animal/person searched.

The third configuration of the invention is used to search only for persons and it does not only provide indication of the direction of a person to the searcher but also provides information to the person being searched regarding the direction of the searcher.

The three configurations of the invention offers the following advantages: They are based on simple two way digital communication systems, they contain simple and inexpensive parts, they are small in size, they cover a long range, they are user friendly, they display to the searcher a locating acknowledgement, and they encompass very effective locating assisting means.

(2) Description of the Prior Art

U.S. Pat. No. 4,151,525 by Strauch et al., 1979 describes an analog radio electric system for locating a given object. The system supplies a displayed angular and range data regarding the position of an object in a reference frame. This invention suffers from the following limitations: it has a complex design, it is limited to locating aircraft as it is extremely difficult for a person to orientates oneself along a displayed particular angular displacement and the displayed range does not carry any particular significance to a person who is trying to locate an item or a person.

U.S. Pat. No. 4,476,469 by Lander, 1984 describes an analog apparatus which can assist in locating an object. It comprises a searcher and a locator attached to the object. The latter gives an audible bleep when it is positioned by the searcher. This invention is limited to assisting in locating short range objects, up to 6 meters range. Hence, it is only suitable for normal domestic and office conditions. It does not display exact direction of the object location apart from the audible bleep which is generated from the locator attached to the object when it is positioned. In addition, it does not give any visual alerting means to assist in locating the object.

U.S. Pat. No. 4,673,921 by Saito et al., 1987 describes an apparatus for finding the location of a car within a vast area. In this invention the transmitter is attached to the car and the receiver is portable. Search is carried out until maximum level of the signal generated from the transmitter is displayed. This invention suffers from the following drawbacks: the transmitter is always radiating a signal which represents a drain on the apparatus battery, it is complex in design and construction, it needs a central processing units with sophisticated algorithms and it is impractical.

U.S. Pat. No. 5,631,641 by Howe, 1995, describes a vehicle locator system which is integrated into the electrical system of a vehicle. This locator is designed specifically for bird hunters. It emits an audible alarm after the elapse of a specified delay time set up by the hunter when leaving the vehicle. This invention is limited in its application. It does not give any visual alerting means to assist in locating the object, It is an integrated part of the vehicle electrical system and not a stand alone device and it is activated whilst the hunter is away from the vehicle, thus representing a constant electrical load drainage on the vehicle battery.

U.S. Pat. No. 5,689,238 by Cannon et al., 1997, describes a method of locating objects by attaching electronic tags to these objects. An electronic tag is identifiable by a unique response code. To locate the object, the response code is entered via an interrogator. The interrogator sends a signal that causes the tag to emit a sound. This invention is only operational if the identifying unique response code stored on the electronic tag is not tampered with in any way. Also if this code is inadvertently erased, the locator will be obsolete.

U.S. Pat. No. 5,786,758 by Bullock, 1998, describes a vehicle locator system combining a remote transmitting unit and a vehicle mounted receiving unit which actuate a light source mounted on the vehicle's exterior to facilitate the location of the vehicle by the searcher in a crowded or dimly lit places. This system is also capable of selectively actuating the vehicle's horn. This invention suffers from the complexity in mechanical structure and the interference with the car exterior. In addition, the partially lowered vehicle window necessary for instalment the vehicle's exterior light source represents a security issue for the vehicle. In addition, the light source may accumulate dirt and grit and due to being subjected to the external environmental conditions may malfunction frequently.

U.S. Pat. No. 5,714,932 by Castellon et al., 1998, describes a radio frequency security system with direction and distance locator. The radio frequency security system includes a central control unit and a plurality of portable transmitters which are in radio frequency communication with the central control unit. The system can be used to detect if a child or an inanimate object has crossed a specified boundary security region. It can also yield information regarding range and direction. This invention has a complex design as it includes a central control unit containing a central processing unit and its associated memory devices, a directional detection circuit, a threshold detection circuit, a distance measuring circuit, a keypad input device, an antenna system, an identification circuit and several displays.

The present invention offers a novel uncomplicated design and construction, long range, low cost, location acknowledgement, small size, user friendly and ease of use, no drainage on the power supply whilst on the waiting mode and low drainage on the power supply whilst on the search mode. The design is simple and it does not require a central processing unit (CPU) with its associated sophisticated control algorithms. It has three optional designs or configurations. The first gives an audio or visual alerting facility to assist in locating the whereabouts of an object/animal/person. This is realized via triggering audio means (buzzers, audio messages or music) and/or visual means such as flashing display units when an object/animal/person is located. The second design, in addition to giving the alerting facility mentioned above, it gives the searcher the facility of finding the direction of the object/animal/person to be located. The third design is suitable for locating a person where an addition to give the alerting and the direction finding facility described above, it also enables the person to be located the direction of the searcher.

The scope of this invention should be determined by the appended claims and their legal equivalent rather than solely by the examples given.

SUMMARY

A locator intended to give alerting (audio and/or visual) facility and a direction indication to the whereabouts of an object/animal/person comprises a portable transmitter/receiver unit carried by the searcher and a transmitter/receiver unit mounted on an object/animal or carried by a person. To indicate the direction of location of an object/animal/person, one or both of the antennas within these units should be installed on a motorized means. The power supply to both units and the motorized means is a small rechargeable battery.

The transmitter in the portable transmitter unit and the transmitter/receiver unit mounted on an object or carried by a person includes the following basic building blocks: a directional antenna(10) or (28), a line driver means which generates a uniquely coded digital signal to be transmitted (2), a frequency shift keying means to modulate the encoded signal(4), an amplifier to amplify the modulated signal(6), amplification being function of the required range of the locator and a radio frequency modulation unit(8).

The receiver in the portable transmitter/receiver unit and the transmitter/receiver unit mounted on an object/animal or carried by a person includes the following building blocks: a directional antenna(12), a radio frequency demodulator unit to demodulate the signal received from the transmitter in the portable transmitter/receiver unit(14), an amplifier unit which amplifies the demodulated signal(16), a frequency shift keying demodulator(18), a digital decoder which decodes the demodulated encoded digital signal(20) and an alerting facility encompassing an audio and/or visual means (24).

DESCRIPTION OF THE PREFERRED EMBODIMENTS

This invention is described as three optional designs. The first design gives alerting facility to the whereabouts of an object/animal/person via triggering buzzers/audio message/music/song and/or flashing display means. It consists of a portable transmitter unit which includes the building blocks shown in FIG. 1 and an object/animal mounted or a person carried receiver unit which includes the building blocks shown in FIG. 2. The portable transmitter unit is carried by the searcher and each sub-unit within this unit is powered from a Small power supply unit which can be a rechargeable battery via a Single Pole Single Throw Switch (SPST). Both of the power supply and the SPST are not shown in FIG. 1. This is because FIG. 1 is only a block diagram and not a circuit diagram.

Figure 2:
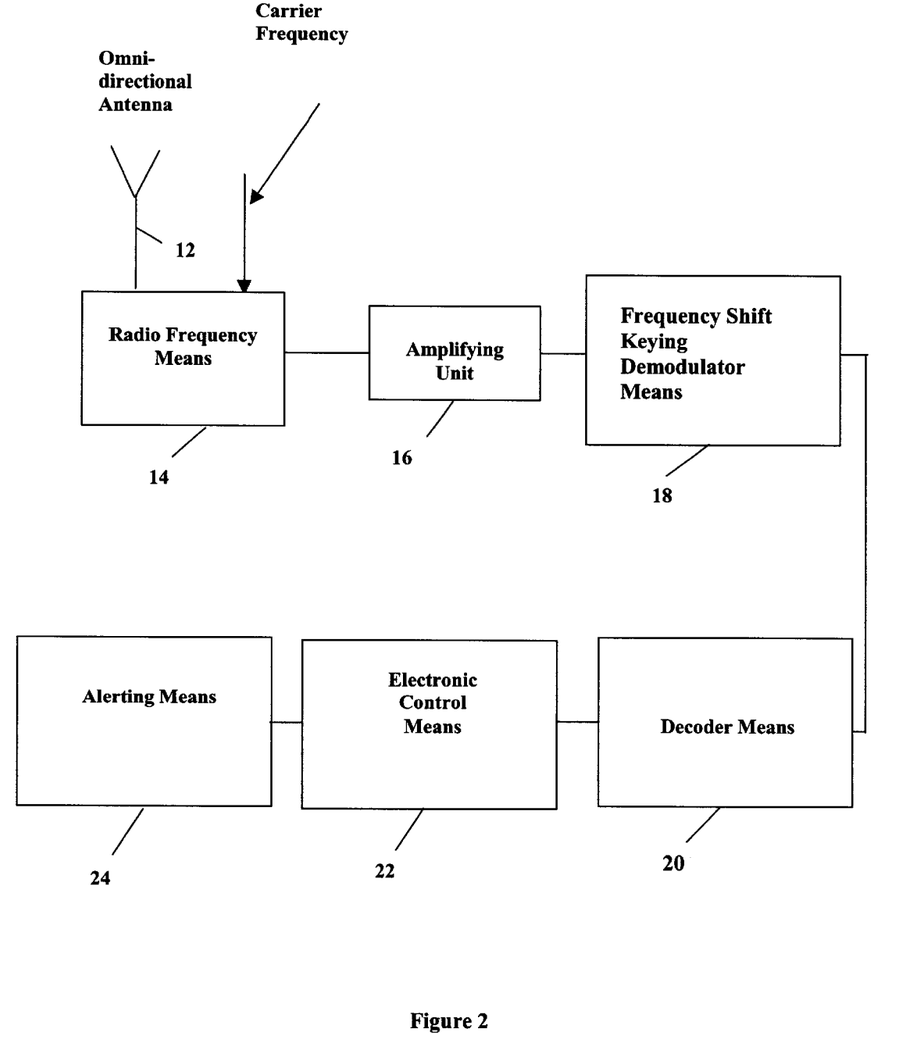
FIG. 2 is a block diagram of the basic FSK reception digital communication system used in the present invention.

The object/animal mounted or person carried receiver unit is powered by another small power supply that can be a rechargeable battery which will energize the building blocks in FIG. 2 via an SPST. Again, since FIG. 2 is only a block diagram and not a circuit diagram both of the power supply and the SPST are not shown in FIG. 2.

Figure 6:
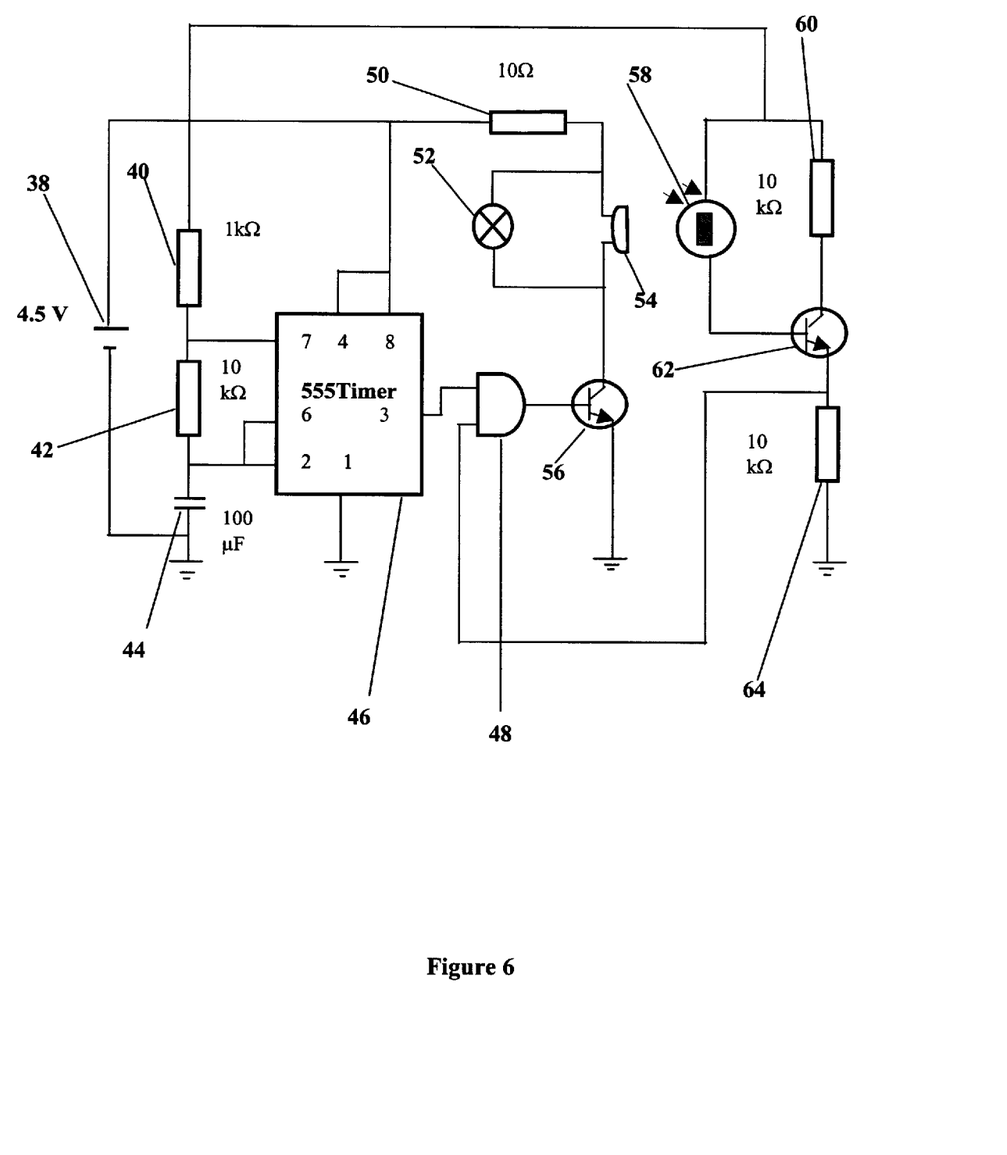
FIG. 6 is a detailed circuit diagram of the audio/visual alarm circuit.

The power supply(38), however, can be seen in the circuit diagram shown in FIG. 6 representing blocks(22) and (24) in the block diagram of FIG. (2).

Figure 1:
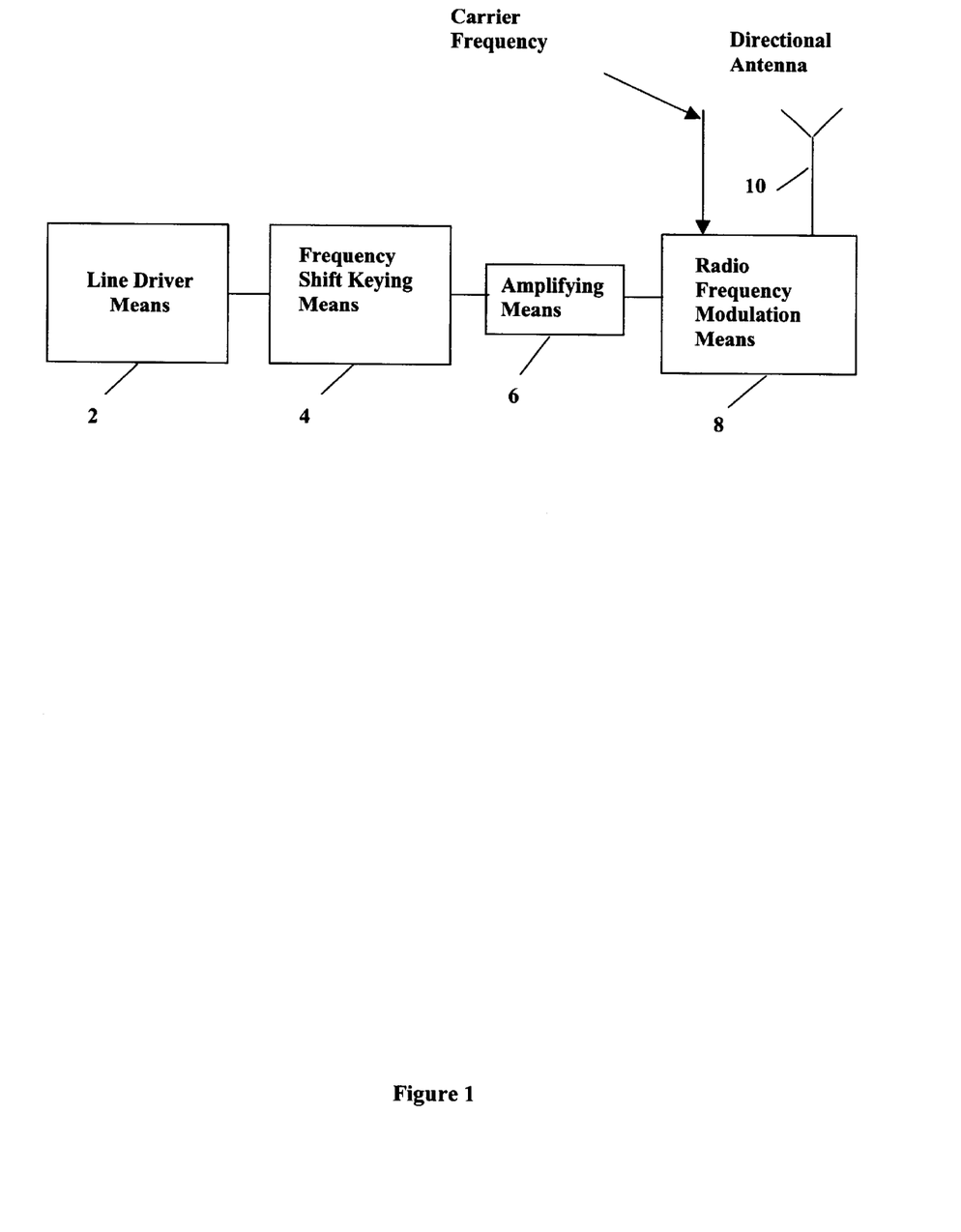
FIG. 1 is a block diagram of the basic frequency shift keying (FSK) transmission digital system used in the present invention.
Figure 7:
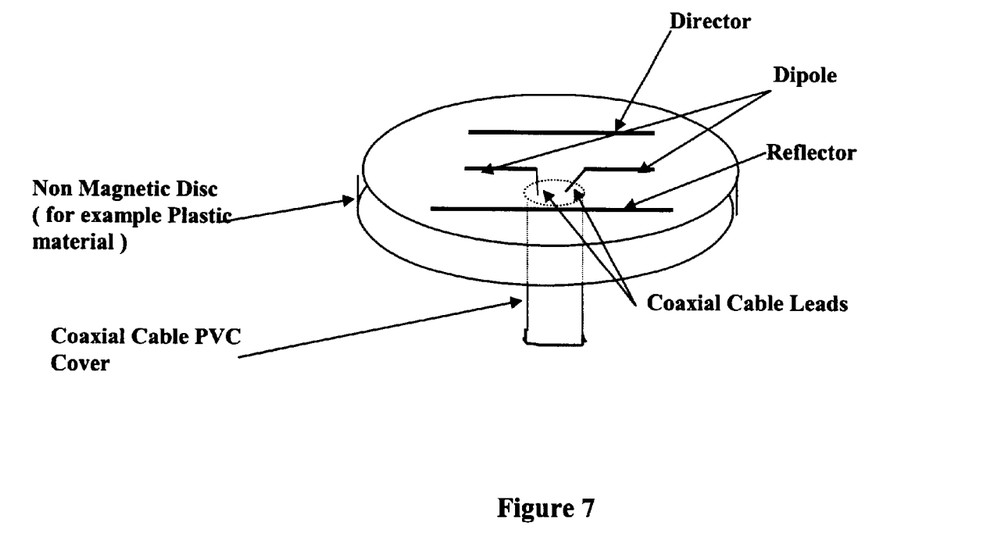
FIG. 7 is a perspective view of the directional antenna illustrating the mounting of the dipole and the director on a non-metallic disc.

In the portable transmitter unit, FIG. 1, the line driver means(2) generates a unique encoded digital signal which is to be transmitted. The number of bits in this digital signal determines the number of possible unique encoded signals. This signal is fed to the frequency shift keying(FSK) means (4) which modulates the signal such that a logic 1 in this signal is represented by an audio signal of any frequency between 200–3100 Hz and logic 0 is represented by an audio signal within the same range but of a different frequency value. The bandwidth of the amplifier is about 3.1 kHz. A level of amplifier output power of about 25 milliwatts is needed for a transmission range of about 500 meters. The output signal from the amplifier is fed to the radio frequency modulating means(a mixer circuit)(8) with a carrier frequency of about 173, 418 or 918 MHz. The output of the mixer circuit is connected to the coaxial cable feeding the directional antenna(10). The antenna radiates the radio frequency modulated signal in the form of electromagnetic waves. The antenna is of the dipole type with a director and a reflector. It is mounted horizontally on a non-metallic disc for a horizontally polarised transmission. The arrangement is shown in FIG. (7). The dipole consists of two metallic rods of a few millimetres in diameter; each has a length of one fourth of the wavelength of the radiated electromagnetic waves. For a radio frequency of 918 MHz, this represents a length of 3 inches. The director and the reflector are also made of metallic rods of a few millimetres in diameter and are situated at a distance of about one tenth of the wavelength(1.2 inches for a radio frequency of 918 MHz) respectively ahead and behind the dipole. The director has a length of about 0.45 the wavelength(5.4 inches for a radio frequency of 918 MHz) and the reflector has a length of about 0.55 the wavelength(6.6 inches for a radio frequency of 918 MHz).

One rod of the dipole is connected to the coaxial cable which is connected to the live node of the frequency modulation means and the other rod is connected to the braiding of this coaxial cable which is connected to the earth point.

In the object/animal mounted or a person(called the target thereafter) carried receiver unit, FIG. 2, the receiving omin-directional antenna(12) is of a dipole type similar to that shown in FIG. 7 but the director and reflector are eliminated in order to remove the directionality of the antenna radiation pattern. Hence, the searcher carrying the portable transmitter unit, FIG. 1, can locate the target from any direction.

When the receiver unit detects a signal transmitted from the portable transmitter unit, this implies that the searcher is in line the target. This signal is fed to the demodulation unit(14) which is supplied with a carrier signal with a frequency of about 173,418 or 918 MHz. The output signal from(14) is fed to the amplifier means(16) and then to the FSK demodulation means(18). The output from(18) is fed to a decoder means(20) to decode the encoded signal. The output from (20) triggers the electronic control means (22). The circuit diagram of(22) is shown in FIG. 6. When the electronic control means is triggered it energizes the alerting means(24) which give visual flashes and audible sound which can be seen and heard at the required range. These are included in FIG. 6 and are designated respectively as numbers 52 and 54.

FIG. 6 shows the alerting device electronic unit circuit diagram together with the alerting unit (units number 6 and 7 in FIG. 2). In this figure the communication system is represented by a light sensitive resistor (11), when the receiver senses the transmitted signal the value of the resistor is at its minimum. The circuit consists of the following components: (1) 4.5 dc power supply (it can be a small rechargeable battery), (2), (3) and (4) are external passive circuit components for the astable multivibrator timer(5) in order to enable the timer to generate pulses at a few Hz frequency. Item (6) is an AND logic gate. One input to this gate is the output signal from the 555 timer. The other input to the gate comes from the voltage across resistor (14). Transistor (13) base current is the current through the light sensitive resistor (11). Item (12) is a current limiting resistor. When the AND gate is enabled, transistor (10) conducts, thus connecting the power supply via a current limiting resistor(7) to item (8) which is the flasher part of the alerting unit and item(9) which is the buzzer/bleeper part of the alerting unit.

Figure 3:
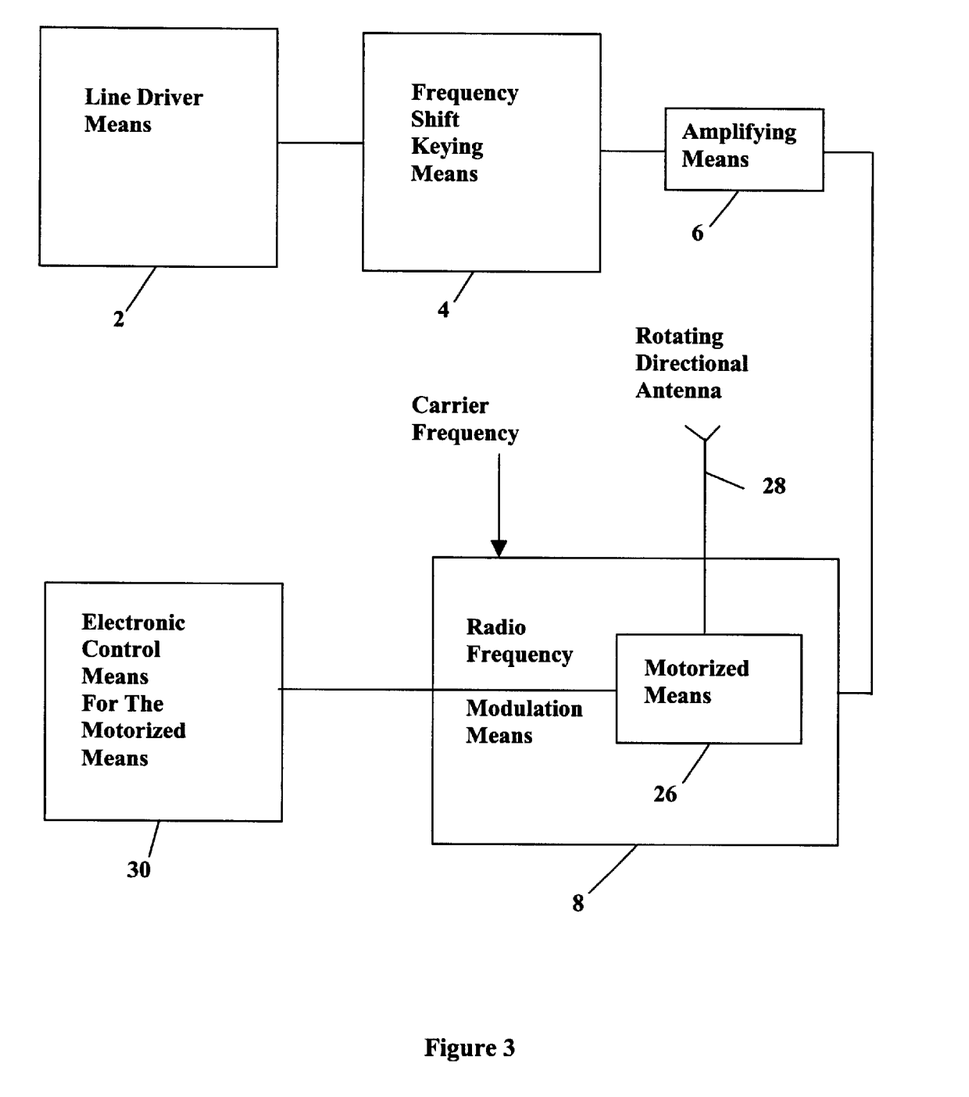
FIG. 3 is a block diagram of the basic FSK motorized antenna transmission digital communication system used in the present invention.
Figure 8:
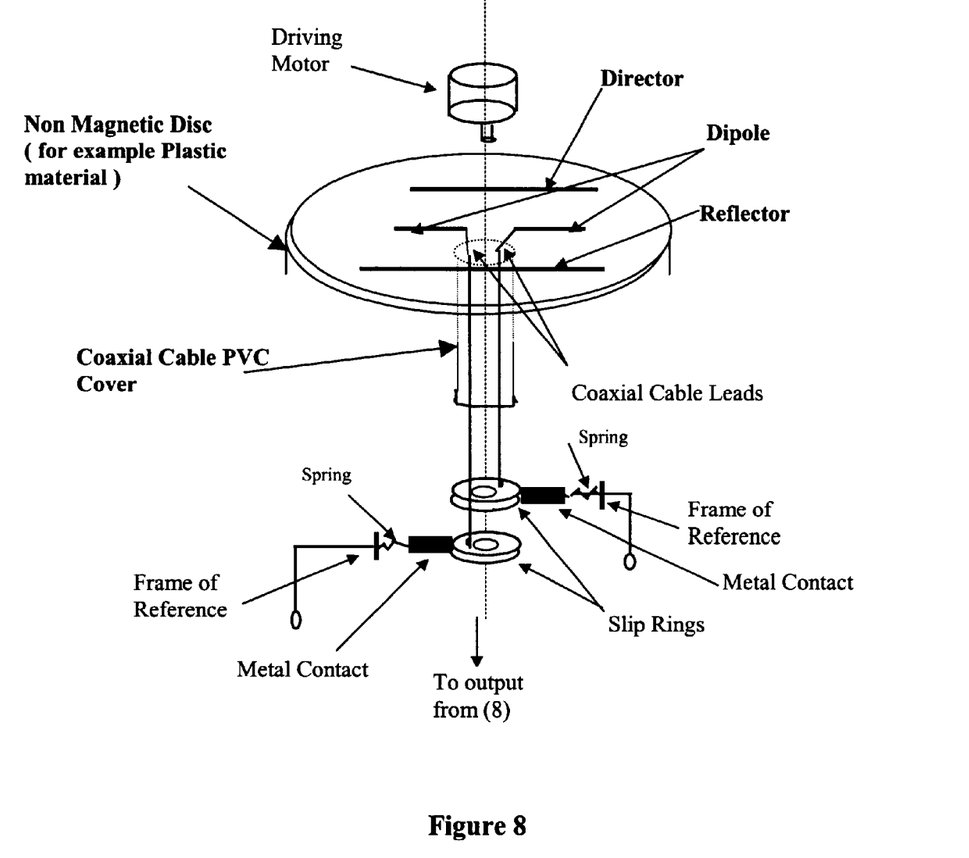
FIG. 8 is a perspective view of the motorized directional antenna.

A modification of the portable transmitter in design 1 is shown in FIG. 3. All the building blocks in this configuration are identical to those shown in FIG. 1. All the building blocks in this configuration are identical to those shown in FIG. 1 apart from the fact that in this modified design the directional antenna(28) is carried on a motorized means(26). The driving motor in this motorized means is supplied from the dc power supply of this transmitter unit via a motor electronic control means(30). The motor rotates at a low speed. As it is carrying the directional antenna, it facilitates searching for the target in multi-directions (within an angular displacement of 360 degrees) without the need for the searcher to turn around continuously so as to aim the directional antenna(28) in the target direction. The motorized antenna(28) and the motorised means are shown in FIG.(8).

In FIG. 8 it is shown that the antenna is in the form of a dipole form as the one shown in FIG. 1 (10). It is horizontally installed on the top surface of a non-metallic disc. The disc is mechanically coupled to the rotating part of the driving motor. Two ends of the coaxial cable leads are soldered to the dipole ends and the other ends are soldered to two cylindrical slip rings made of a conducting material such as copper. Two spring loaded metal contacts are in permanent contact with these slip rings. These contacts are soldered to the other ends of the coaxial cable. Two wires are soldered to the slip rings and they are connected to the output from (8) in FIG. 1.

Figure 4:
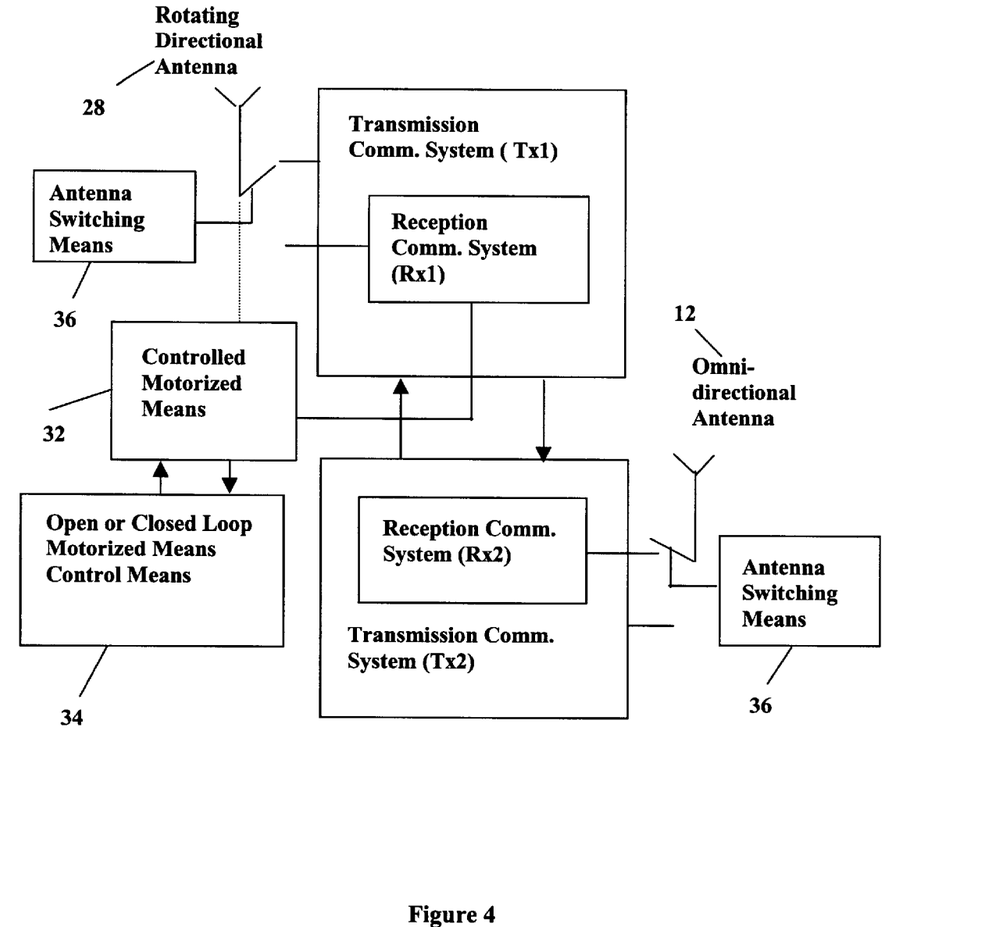
FIG.4 is a block diagram of the second design configuration in the present invention comprising two portable transceiver units, one unit employing a motorized directional antenna and the other unit employing an omni-directional antenna.

The invention second design configuration(embodiment) block diagram is shown in FIG. 4. In this design, the portable searching unit has on board a transmitter and a receiver (Tx1 and Rx1 respectively) and one directional antenna(28) that is used for both of transmission and reception. The target carried unit has also a transmitter and a receiver on board (Tx2 and Rx2 respectively) and one omin-directional antenna(12). The portable unit antenna is mounted on a controlled motorized means(32). As in the case for design 1, the power supply to this unit is connected via a single pole single through switch. Both of the power supply and the switch are not shown in FIG. 4. The directional antenna(28) is switched to function as a transmitting or receiving antenna via an antenna switching unit(36) which is a standard RT(Receiver/transmitter) switch. This switch encompasses a push button switch to enable the switching between the two states of transmission and reception and two unidirectional electronic switching devices (such as diodes) connected in anti-parallel so as to allow the transmitted signal to flow in one direction without interfering with the received signal. The omni-directional antenna for Tx2/Rx2 unit(12) also uses an RT switch(36) in order to enable this antenna to function as a transmitting or receiving antenna. In this case this switch is controlled electronically by a signal received from the portable unit in order to acknowledge the reception of this signal.

The controlled motorized means carrying the antenna serving the portable unit(32) is driven by a motor which is controlled by an open or closed loop motor control electronic circuit or simply motor control unit(34). When a signal is detected by Rx2, the omni-directional antenna(12) is switched to operate as a transmitting antenna by means of the antenna switching unit(36) and a signal is transmitted from Rx2 towards the portable unit. When this signal is detected by Rx1, a control signal outputted from Rx1 is forwarded to the motor control unit(34) so as to stop the motor driving the motorized means which is attached to the portable unit antenna(28). A disc is attached to the surface of the motorised means with an arrow engraved on its surface will, thus, be directed towards the target. Thus, giving an indication to the searcher carrying the portable unit of the direction along which to move in order to locate the target. The motor in the motorized means(32) should be a small motor with a small moment of inertia. The directional antenna(28) has a negligible moment of inertia as well. Accordingly, the motorized means(32) will almost stop immediately after the portable unit has received a signal from the target unit(open loop control).

In the case that the motorized means(32) carrying the antenna(28) overshoots slightly beyond the direction towards the target, the signal received by Rx1 will diminish due to the directivity of antenna(28). A corrective signal is generated within the motor control unit(34) which is fed to the motor in the motorised means unit(32) so as to return the portable unit antenna(28) in the direction of the target again (closed loop motor control).

Figure 5:
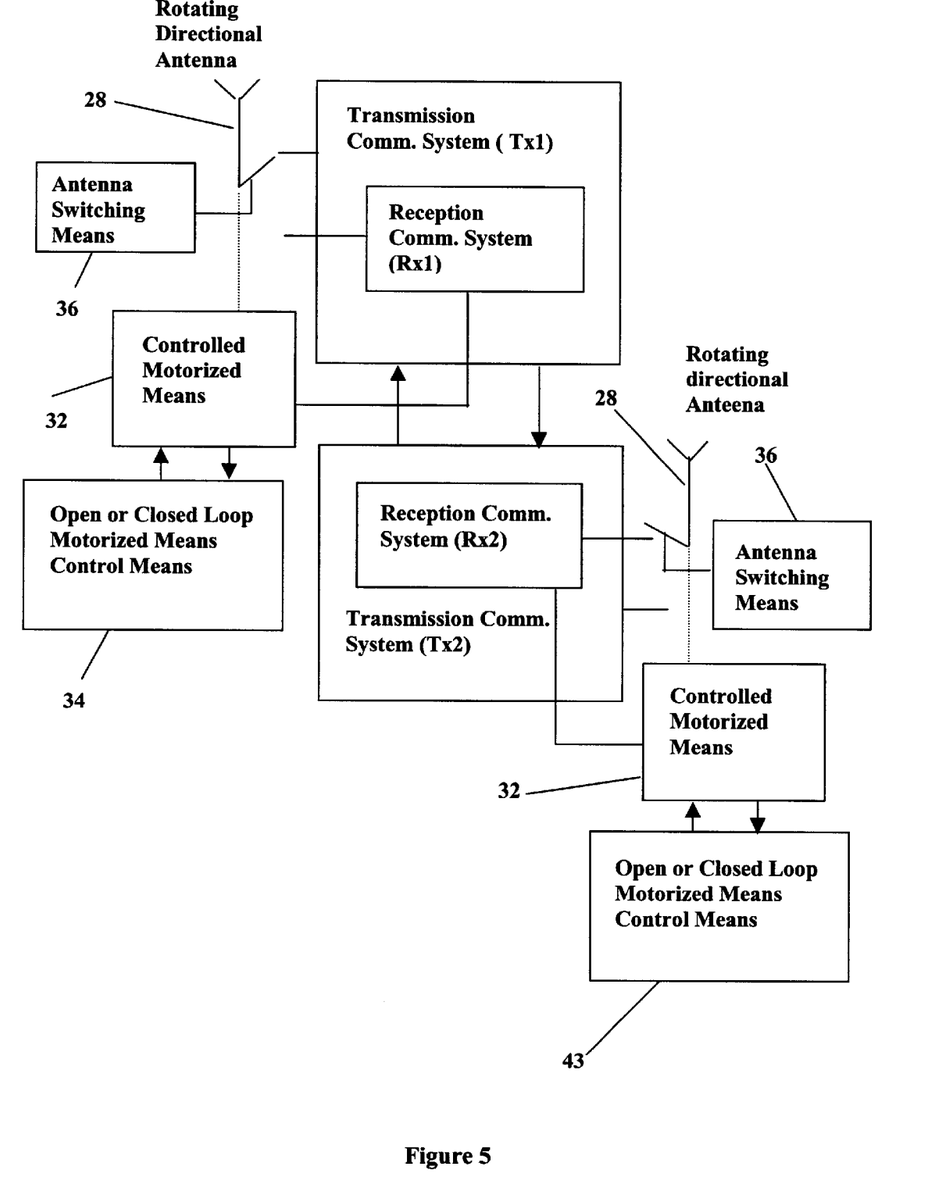
FIG. 5 is a block diagram of the third design configuration in the present invention comprising two portable transceiver units both employing motorized directional antennas.

The invention third and final design configuration (embodiment) block diagram is shown in FIG. 5. This design is suitable for searching for a person.

The difference between the second design configuration, FIG. 4, and this design is that the omni-directional antenna used for Tx2/Rx2 shown in FIG. 4, is replaced by a directional antenna(28) which is mounted on a motorized base(32). As it can be seen in FIG. 5, the portable transmitter/receiver unit, Tx1/Rx1, carried by the searcher uses identical directional antenna(28) and motorized base (32) arrangements. The transmitter/receiver unit Tx2/Tr2 is carried by the person being searched for. The motor in the motorized base(32) is controlled remotely by the signal received by Rx2 from Tx1 by means of an open or closed loop motor control circuit(34). This circuit controls the motor in either open loop or closed loop fashion as it was explained above. A disc attached to the motorised means carrying the directional antenna(28) serving Tx2/Rx2 unit, with an arrow engraved on its outer surface, will, thus, give an indication of the direction of location of the searcher to the person carrying this unit.

Conclusions, Ramifications and Scope

A simple, low cost and fit for purpose object/animal/person locator device is described. Three configurations are presented. The first is the basic one of all the three. Its mere function is to give an alerting means (audio or visual) which assists the searcher in locating the position of an object/animal/person. The alerting means forms a part of the receiver unit carried by mounted on object/animal or carried by a person. The searching unit is a portable transmitter unit carried by the searcher.

The second configuration of the device described in this invention gives an indication of the direction of the target (an object/animal/person) to the searcher in addition to giving the alerting means which is available in the basic configuration. This is made possible due to the two way communication system made available within the structure of this second configuration of the device. Moreover, the antenna of the portable transmitter/receiver unit carried by the searcher is mounted on a motorised means with an arrow engraved on a disc attached to this motorised means. Once the target is located this antenna is locked to the target, thus directing the arrow towards the target. In addition an acknowledgement message that the target had been found is displayed on a display unit which forms a part of the portable transmitter/receiver unit.

The third configuration of the device described in this invention is used for locating persons. Hence, it does not only give alerting and direction indication means to the searcher but it also gives a direction indication means to the person being searched for. This is realised by means of mounting the antenna of the transmitter/receiver unit carried by this person on a motorised means with a disc marked with an arrow attached to it. This is similar to the structure explained in the second configuration.

Alternative means of the modulating and demodulating the transmitted and the received signals respectively are possible ramifications of this invention. This will affect the range, power supply consumed power, communication frequency and the shape, size and dimensions of the antennas used. Alternative means of directional indication such as using different symbols to indicate the target direction instead of an arrow (for example using the picture of a finger pointing towards the direction of the target) is another possible ramification of the invention. If the device described in this invention is meant to be used to locate objects/creatures/persons under water or any other different media, alternative ingredients of the communication system presented will have to be used but these are considered to be within the scope of applications of the present invention.

What is claimed is:

1. An apparatus for locating an object/animal/person within a vast area, comprising a portable transmitter unit carried by the searcher or locator and an object/animal mounted or a person carried receiver unit, said portable transmitter unit including:

power supply means; line driver means to generate an n-bit unique encoded digital signal in order to enable unique activation and locating in a field of locating apparatuses; frequency shift keying means which modulates the encoded signal such that a logic one in the said signal is represented by an audio signal at a specified frequency and a logic zero is represented by an audio signal at a different frequency; frequency modulation means where a carrier signal at a radio frequency is modulated by the frequency shift keying modulated encoded digital signal; amplifying means to amplify the said signal prior to feeding it to the said frequency modulation means; directional antenna means for transmitting the amplified signal outputted from the said amplifying means;

said object/animal mounted or person carried receiver unit including:

power supply means; omni-directional antenna means for receiving the transmitted signal from the said portable transmitter unit; frequency demodulation means to demodulate the said transmitted signal; amplifying means which amplifies the demodulated signal outputted from the said frequency demodulation means; frequency shift keying demodulation means to demodulate the output signal from the said amplifying means; decoder means to decode the output signal from the said frequency shift keying demodulation means; electronic control means triggered from the said decoder means; alerting means fed from the said electronic control means.

2. The apparatus of claim 1 wherein said alerting means implies audio or visual means to alert for an object/animal/person location; said audio means comprises a buzzer, a message player, or a piece of song or music player, which starts to buzz, play music/song or a message in a specially recognized sound;

said visual means implies a bulb/lamp, which starts to flash at a recognized frequency and color.

3. The apparatus of claim 1 wherein said portable transmitter unit is mounted on an object/animal or carried by a person to be found and wherein said object/animal mounted or person carried receiver unit is carried by the searcher.

4. The apparatus of claim 3 wherein said receiver unit audio and visual alerting means intensity increases as the searcher comes closer to an object/animal/person implying that alerting audio means frequency increases and visual display means intensity increases as the searcher gets closer to an object/animal/person being located.

5. The apparatus of claim 1 wherein said omni-directional antenna means is a helical whip antenna of the type used in wireless applications and is designed to operate around 902–928 MHz frequency range.

6. The apparatus of claim 1 wherein the said electronic control means in the receiver unit comprises an oscillator or a pulse generator; logic device/devices; analogue device/devices and passive circuit components;

Said control means connects the said alerting means to the power supply to energize it when the transmitted signal from the portable transmitter is received by the object/animal or the person carried receiver.

7. The apparatus of claim 1 wherein the said frequency shift keying means logic one is represented by an audio signal of a frequency around 1800 Hz and logic zero is represented by an audio signal of a frequency around 1200 Hz.

8. The apparatus of claim 1 wherein the said frequency modulation means the carrier frequency is around 173, 418 or 918 MHz.

9. The apparatus of claim 1 wherein the said decoder means can trigger the activating mechanism of a car alarm/air-conditioning/heater, on/off switching locking mechanisms of doors, open/close operating mechanisms of windows . . . etc, implying that the said portable transmitter unit will contain several line drivers generating unique digitally encoded signals which upon being received by the receiver unit, will activate the above mentioned car apparatuses;

said line driver is controlled by an individual switch installed on the said portable transmitter unit and the switch is fitted with display means to indicate the status of the car apparatuses.

10. The apparatus of claim 1 wherein the said portable transmitter unit directional antenna carried by the searcher is mounted on a motorized means to facilitate the search for an object/animal/person in multi-directions without the need for the carrier of the said motorized transmitter unit to turn around in order to aim in the direction of an object/animal/person to be located.

11. The apparatus of claim 10 wherein the said motorized means is a small electric motor.

12. The apparatus of claim 10 wherein the said motorized means include an open or closed loop electronic circuit means for the motor shaft position.

13. The apparatus of claim 11 wherein the said motor is a small flat structure direct current motor with printed circuit board armature to minimize power consumption.

14. An apparatus for locating an object/animal/person within a vast area comprising a portable motorized transmitter/receiver unit carried by the searcher and an object/animal mounted or a person carried transmitter/receiver unit, said portable motorized transmitter/receiver unit including:

power supply means; line driver means to generate an n-bit uniquely encoded digital signal in order to enable unique activation and locating in a field of locating apparatuses; frequency shift keying means which modulates the encoded signal such that a logic one in the said signal is represented by an audio signal at a specified frequency and a logic zero is represented by an audio signal at a different frequency; frequency modulation means where a carrier signal at a radio frequency is modulated by the frequency shift keying modulated encoded digital signal; transmitter amplifying means to amplify the said coded signal prior to feeding it to the said radio frequency modulation means; directional antenna means for transmitting the amplified signal outputted from the said amplifying means; motorized means where the said directional antenna is mounted on a moving platform to facilitate the search for an object/animal/person in multi-directions without the need for the carrier of the said portable motorized transmitter unit to turn around in order to aim in the direction of an object/animal/person to be located; antenna switching means to switch between the two functional states of the directional antenna in transmitting and receiving; frequency demodulation means to demodulate the transmitted signal from the transmitter/receiver unit mounted on an object/animal or carried by a person; receiver amplifying means that amplifies the demodulated signal outputted from the said frequency demodulation means; frequency shift keying demodulation means to demodulate the output signal from the said receiver amplifying means; decoder means to decode the output signal from the said frequency shift keying demodulation means; electronic positioning means fed from the said decoder means to send a positioning signal to the said motorized means to aim it in the direction of an object/animal or person; directional indicating means attached or shown on the body of the motorized means to visually indicate the direction of an object/animal/person;

said object/animal mounted or person carried transmitter/receiver unit including:

power supply means; omni-directional antenna means for receiving the transmitted signal from the said portable motorized transmitter/receiver unit and for transmitting a signal to the portable motorized transmitter/receiver carried by the searcher; antenna switching means to switch between the two functional states of the directional antenna in transmitting and receiving; frequency demodulation means in order to demodulate the transmitted signal from the portable motorized transmitter/receiver unit; receiver amplifying means which amplifies the demodulated signal outputted from the said frequency demodulation means; frequency shift keying demodulator means which demodulates the signal outputted from the said receiver amplifying means; decoder means to decode the signal outputted from the said receiver amplifying means; decoder means to decode the signal outputted from the said frequency shift keying demodulator means; line driver means to generate a unique encoded digital signal; frequency shift keying means that modulates the encoded signal such that a logic one in the said signal is represented by an audio signal at a specified frequency and a logic zero is represented by an audio signal at a different frequency; frequency modulation means where a carrier signal at a radio frequency is modulated by the frequency shift keying modulated encoded digital signal; amplifying means to amplify the said encoded signal prior to feeding it to the said radio frequency modulation means.

15. The apparatus of claim 14 wherein said portable transmitter/receiver unit receiver part includes an electronic control means triggered from the said decoder means in this part and an alerting means fed from the said electronic control means.

16. The apparatus of claim 15 wherein said alerting means implies audio or visual means to alert for an object/animal/person location;

said audio means such as a buzzer, a message or a piece of song or music, which starts to buzz, play music/song or a message in a specially recognized sound;

said visual means implies a bulb/lamp, which starts to flash at a recognized frequency and color.

17. The apparatus of claim 16 wherein said audio and visual alerting means intensity increases as the searcher comes closer to an object/animal/person implying that alerting audio means frequency increases and visual display means intensity increases as the searcher gets closer to an object/animal/person.

18. The apparatus of claim 14 wherein said object/animal mounted or person carried transmitter/receiver unit receiver part includes electronic control means triggered from the said decoder means in this part and an alerting means fed from the said electronic control means.

19. The apparatus of claim 18 wherein said alerting means implies audio or visual means to alert for an object/animal/person location;

said audio means comprises a buzzer, a message or a piece of song or music, which starts to buzz, play music/song or a message in a specially recognized sound;

said visual means implies a bulb/lamp, which starts to flash at a recognized frequency and colour.

20. The apparatus of claim 19 wherein said decoder means in the said car mounted transmitter/receiver unit can trigger the activating mechanism of a car alarm/air-conditioning/heater, on/off switching locking mechanism of doors, open/close operating mechanisms of windows . . . etc., implying that the said portable motorized transmitter/receiver unit will contain several line drivers means generating unique digitally encoded signals which upon being received by the car installed receiver unit will activate the above mentioned car apparatuses;

said line driver means is controlled by an individual switch installed on the said portable motorized transmitter/receiver unit.

21. The apparatuses in claims 15 or 18 wherein said electronic control means comprises an oscillator or a pulse generator, logic and analogue device/devices and passive circuit components;

said control means connects the said alerting means to the power supply when the transmitted signal from the portable motorized transmitter/receiver is received by the object/animal mounted or the person carried transmitter/receiver unit.

22. The apparatus of claim 14 wherein said antenna switching means comprises analogue and/or digital switching devices and passive circuit components.

23. The apparatus of claim 14 wherein said directional indicating means comprises an aluminum disc with an arrow engraved on its surface attached to the motorized means to indicate the direction of an object/animal/person.

24. The apparatus of claim 14 wherein said frequency shift keying means logic one is represented by a signal of a frequency around 1800 Hz and logic zero is represented by a signal of a frequency around 1200 Hz.

25. The apparatus of claim 14 wherein said motorized means is a small motor.

26. The apparatus of claim 25 wherein said motor is a small flat structure direct current motor with printed circuit board armature to minimize power consumption.

27. The apparatus of claim 25 wherein said motorized means include an open or closed loop electronic circuit means for the motor shaft.

28. An apparatus for locating a person within a vast area comprising a motorized portable transmitter/receiver unit carried by the searcher and another identical portable motorized transmitter/receiver unit carried by the person to be located or trying to locate the searcher.

said portable motorized transmitter/receiver unit including:

power supply means; line driver means to generate an n-bit uniquely encoded digital signal in order to enable unique activation and location in a field of locating apparatuses; frequency shift keying means which modulates the encoded signal such that a logic one in the said signal is represented by an audio signal at a specified frequency and a logic zero is represented by an audio signal at a different frequency; frequency modulation means where a carrier signal at a radio frequency is modulated by the frequency shift keying modulated encoded digital signal; transmitter amplifying means to amplify the said encoded signal prior to feeding it to the said radio frequency modulation means; directional antenna means for transmitting the amplified signal outputted from the said amplifying means and for receiving the signal transmitted from a similar apparatus carried by the person to be located; motorized means where the said directional antenna is mounted on a moving platform to facilitate the search for a person in multi-directions without the need for the carrier of the said portable motorized transmitter unit to turn around in order to aim in the direction of the person to be located; antenna switching means to switch between the two functional states of the directional antenna in transmitting and receiving; frequency demodulation means to demodulate the received signal transmitted from a similar apparatus carried by the person to be located; receiver amplifying means that amplifies the demodulated signal outputted from the said frequency demodulation means; frequency shift keying demodulation means to demodulate the output signal from the said receiver amplifying means; decoder means to decode the output signal from the said frequency shift keying demodulation means; electronic positioning means fed from the said decoder means to send a positioning signal to the said motorized means to aim it in the direction of the person to be located; directional indicating means attached or shown on the body of the motorized means to visually indicate the direction of the person to be located.

29. The apparatus of claim 28 wherein the receiver part in said portable transmitter/receiver includes an electronic control means triggered from the said decoder means in this part and an alerting means fed from the said electronic control means.

30. The apparatus of claim 29 wherein said alerting means implies audio or visual means to alert from a person location;

said audio means comprises a buzzer, a message or a piece of song or music, which starts to buzz, play music/song or a message in a specially recognized sound;

said Visual means implies a bulb/lamp, which starts to flash at a recognized frequency and color.

31. The apparatus of claim 30 wherein said audio and visual alerting means intensity increases as the searcher comes closer to the person to be located or as the person to be located comes closer to the searcher implying that alerting audio means frequency increases and visual display means intensity increases as the searcher gets closer to the person to be located or as the person to be located gets closer to the searcher.

32. The apparatuses in claim 29 wherein said electronic control means comprises an oscillator or a pulse generator, logic and analogue device/devices and passive circuit components;

Said control means connects the said alerting means to the power supply when the transmitted signal from the motorized transmitter/receiver unit carried by the person to be located is received by the searcher or vice versa.

33. The apparatus of claim 28 wherein said antenna switching means comprises analogue and/or digital switching devices and passive circuit component in order to realize automatic switching of the antenna to the transmission mode in order to acknowledge the reception of the signal forwarded from the searcher to the person searched.

34. The apparatus of claim 28 wherein said directional indicating means comprises an aluminum disc with an arrow engraved on its surface attached to the motorized means to indicate the direction of the person to be located by the searcher or vice versa.

35. The apparatus of claim 28 wherein said frequency shift keying means logic one is represented by a signal of a frequency around 1800 Hz and logic zero is represented by a signal of a frequency around 1200 Hz.

36. The apparatus of claim 28 wherein said motorized means is a small electric motor.

37. The apparatus of claim 36 wherein said motor is a small flat structure direct current motor with printed circuit board armature to minimize power consumption.

38. The apparatus of claim 36 wherein said motorized means include an open or closed loop electronic circuit means for the motor shaft.

39. The apparatus of claim 28 where identical apparatuses to the said portable transmitter/receiver unit are carried by many persons being located;

said unit will contain several line drivers means generating different unique digital encoded signals which will be routed to the transmitter part in the said portable transmitter/receiver unit using switching means which activate the alerting means in this unit, thus enabling them to acknowledge to the searcher that they have been found.

40. The apparatus of claim 39 wherein the alerting means in said portable transmitter/receiver unit carried by the searcher contains a number of visual display means matching the number of the said line drivers so as to enable the persons being located to acknowledge the searcher that they have been found.

* * * * *